United States Patent [19]

Chevrolet

[11] Patent Number: 4,663,171

[45] Date of Patent: May 5, 1987

[54] FOODSTUFF COMPOSITION INTENDED FOR PREPARATION OR DECORATION OF MEATS AND SIMILAR PRODUCTS

[75] Inventor: Gérard Chevrolet, Damphreux, Switzerland

[73] Assignee: Vitroculture S.A., La Colombiere, Switzerland

[21] Appl. No.: 763,146

[22] PCT Filed: Dec. 19, 1984

[86] PCT No.: PCT/CH84/00200

§ 371 Date: Jul. 25, 1985

§ 102(e) Date: Jul. 25, 1985

[87] PCT Pub. No.: WO85/02759

PCT Pub. Date: Jul. 4, 1985

[30] Foreign Application Priority Data

Dec. 21, 1983 [CH] Switzerland .................. 6819/83

[51] Int. Cl.[4] .................. A23L 1/27; A23L 1/275
[52] U.S. Cl. .................. 426/250; 426/540; 426/573; 426/575; 426/577
[58] Field of Search .................. 426/575, 577, 573, 250, 426/540

[56] References Cited

U.S. PATENT DOCUMENTS

| | | | |
|---|---|---|---|
| 2,786,763 | 3/1957 | Rivoche | 426/575 |
| 2,791,508 | 5/1957 | Rivoche | 426/575 |
| 3,093,483 | 6/1963 | Ishler et al. | 426/575 |
| 3,973,051 | 8/1976 | Buckley et al. | 426/577 |
| 4,347,261 | 8/1982 | Challen et al. | 426/575 |
| 4,348,418 | 9/1982 | Smith et al. | 426/577 |
| 4,436,759 | 3/1984 | Trieling | 426/575 |

*Primary Examiner*—Jeanette Hunter
*Attorney, Agent, or Firm*—Ladas & Parry

[57] ABSTRACT

A foodstuff composition is discribed which is stable to cooking, free of artificial colorings and appropriate for use, in particular, for the preparation or decoration of meats in moulded, poured or extruded form. In essentially contains an edible mushroom of naturally dark coloration such as *Cenococcum geophilum* of graniform or the black truffle, a gelifying agent such as a pectin or an alginate in combination with calcium ions, texturing agents consisting of proteins, preferably soya bean flour, flavoring substances appropriate for endowing the compositions with a pleasant flavor and taste, and water.

20 Claims, No Drawings

FOODSTUFF COMPOSITION INTENDED FOR PREPARATION OR DECORATION OF MEATS AND SIMILAR PRODUCTS

Public taste, and most especially that of consumers, demands that foodstuff compositions intended for the preparation or decoration of meats and similar products appear dark in colour, generally dark brown. This dark colouration was hitherto most frequently caused by the addition of artificial colourings.

However, the addition of artificial colourings to foodstuffs products periodically arouses criticism in a section of the press and public opinion, but above all it forms the subject of increasingly severe legal prohibitions and limitations, especially in the countries where industrial development is most advanced.

In the countries in question, it is even conceivable that, in the foreseeable future, all artificial colouration of foodstuff products might be forbidden by legislation. For headwaiters, chefs and caterers, this would result in substantial material difficulties in preparing appetizing dishes which, for their part, contribute to the enhancement iof the atmosphere of a meal or to the creation of a feeling of celebration.

Now, a foodstuff composition has now been developed which is appropriate for the preparation or decoration of meats and similar products, and intended to replace the garnishes used hitherto, but which contains no artificial colouring. This composition will consequently be mixed with meat preparations or as a garnish or decorative component on cooked dishes or items of charcuterie such as pâtés and potted meats. It is distinguished by its stability to cooking, the improvement in taste of the foods which contain it, the firmness of their texture and their decorative appearance, as well as by the stability of the colouration which is natural and does not diffuse into the surrounding bulk.

The composition according to the invention is characterised in that it contains:

(a) one or more edible mushrooms, of naturally dark colouration and flavourless or pleasant in flavour, (b) one or more gelifying agents, consisting of polysaccharides appropriate for forming a heat-irreversible gel, that is to say a gel which is stable to cooking, (c) one or more texturing agents consisting of proteins, (d) a balanced combination of flavouring substances, appropriate for endowing the composition with a pleasant flavour and taste, preferably similar to those of the edible mushrooms, and (e) water.

The invention will now be disclosed in more detailed fashion.

(a) As mushroom, *Cenococcum geophilum, Cenococcum graniforme* or the Perigord tuffle or black truffle (*Tuber melanosporum* or *Tuber nigrum*) is preferably used.

The abovementioned Cenococcum is a forest mushroom, classified among the Fungi Imperfecti. It can be cultivated in sterile medium, in conventional solid or liquid nutrient media; its growth period is from 3 to 4 weeks for a temperature range of 19° to 26° C. In culture, it forms a black mycelium with a very delicate taste; it will preferably be used after being cooked. *Cenococcum geophilum* or *graniforme* and the black truffle endow the composition with the desired colouration, reinforce the effect of the texturing agents, and in addition the truffle, even in small proportions, contributes to the improvement in taste. However, the black truffle (*Tuber melanosporum*) is not the only high quality truffle; other truffles such as the winter truffle (*Tuber brumale*) or Burgundy truffle (*Tuber ancinatum*) can also be used. Among the other mushrooms which can be considered, the horn of plenty (*Craterellus cornu copioides*) may be mentioned, the contribution of which, however, is smaller than the abovementioned mushrooms.

The mushroom or mushrooms preferably constitute from 3 to 5% by weight of the composition (fresh weight for the truffle, dry weight for Cenococcum).

(b) The gelifying agent or agents introduced are pectins, originating from applies or the rind of citrus fruits, and water-soluble alginates extracted from brown algae. Both of these are soluble in the cold, and the gels obtained retain their shape when subjected to heat. Starting from high molecular weight pectins, gel formation is induced by cooking in an acidic, sugary medium, the gel forming on cooling. Although the gel thus formed is firm and satisfactory, the conditiions required for gelification (acidic, sugary medium) limit the use of these pectins to special cases of the present composition.

Pectins of lower molecular weight gelify in the cold, on addition of calcium ions; however, the gel thus formed frequently shows poor resistance to being cooked. Thus, the preferred gelifying agents are water-soluble alginates, for example potassium, ammonium, magnesium or sodium alginate; the latter is preferably used. Gel formation is accomplished in the cold or in the hot, by adding calcium ions which are supplied in the form of calcium sulphate, calcium chloride, calcium lactate, calcium citrate or another salt capable of liberating calcium ions. The gel thus obtained is stable to sterilization and cooking.

The gelifying agent can be included in the composition in the proportion of 1 to 5% by weight, according to the degree of firmness which the final product has to possess.

According to a preferred embodiment of the invention, there is introduced a pectin of lower molecular weight or sodium alginate in the presence of a calcium salt of low solubility, such as calcium sulphate, and a complexing agent for calcium ions such as sodium pyrophosphate, used in insufficient proportion to complex all the calcium salt. The calcium sulphate progressively liberates calcium ions, which are immediately bound in the form of complex by the sodium pyrophosphate until the latter is used up. The calcium ions which continue to pass into solution then induce gelification. This procedure delays the gelification of the treated mass, and thereby enables the latter to be shaped by moulding, pouring or extrusion.

(c) The texturing agents can be any common proteins, of animal or plant origin, in particular egg white, meat, fish, the flesh of shellfish, cereal flours, potato flour soya bean flour. The latter is preferred in the practical embodiment of the invention. The use of a binder such as potato starch and a ballast such as bran flour can also contribute to the improvement in texture.

These texturing agents can be used in the composition in a proportion preferably ranging from 3 to 12% by weight in total. In conjunction with the polysaccharides used as gelifying agents, they endow the composition with the fibrous structure characteristic of foodstuff products of direct animal or plant origin.

(d) The flavouring substances are, in particular, a liqueur-like wine such as port, Malaga, or preferably Madeira, optionally supplemented with another wine such as Bordeaux, a sweetener or sugaring product, such as sodium cyclamate, or preferably sugar itself, salt, spices, vegetables or extracts thereof, such as red beetroot juice which gives the composition an earthy taste, this contribution being supplemented or even replaced by other root or tuber vegetables according to the gradation of flavouring desired, natural and synthetic flavourings, appropriate for giving the composition a flavour and taste which recall those of the edible mushrooms, especially those which are specific to the truffle, the said flavourings being able to be supplemented or replaced by fruits and/or plants or their extracts insofar as they yield the desired outcome in respect of flavouring.

The combination of flavouring substances can constitute from 6 to 20% by weight of the composition.

It proves to be advantageous to supplement the composition with a preservative agent such as sodium benzoate (E 211) or sorbic acid (E 200) and/or an antioxidant such as sodium disulphite (E 223) or citric acid (E 330) [E . . . : designation of the substance according to the European Code of permitted food additives]. Provision is thus made for satisfactory preservation of the products and the subsequent use thereof for several weeks after the pack has been opened.

Two preferred examples of the foodstuff composition according to the invention are given below:

| Component | Example 1 | Example 2 |
| --- | --- | --- |
| (a) Cenococcum geophilum, dry weight | — | 3.0–5.0 g |
| Black truffle (Tuber melanosporum), fresh weight | 3.0–5.0 g | — |
| (b) Alginate | 1.0–4.0 | 1.0–4.0 |
| Calcium sulphate (purum) | 1.0–2.0 | 1.0–2.0 |
| Sodium pyrophosphate (purum) | 0.3–1.5 | 0.3–1.5 |
| (c) Soya proteins | 3.0–4.0 | 3.0–4.0 |
| Egg white | 1.0–1.5 | 1.0–1.5 |
| (d) Madeira | 2.3–3.5 | 2.3–3.5 |
| Sugar | 1.3–2.0 | 1.3–2.0 |
| Salt | 1.0–1.5 | 1.0–1.5 |
| Red beetroot juice | 1.2–1.5 | 1.2–1.5 |
| Natural mushroom flavouring | 0.6–1.2 | 0.4–0.6 |
| Bolete flavouring (Maillard reaction) | 0.2–0.3 | 0.2–0.3 |
| Truffle flavouring (Maillard reaction) | 0.2–0.3 | 0.2–0.3 |
| Sodium benzoate | 0.1 | 0.1 |
| Sodium disulphite | 0.05 | 0.05 |
| Water, q.s. 100 g | | |
| | 100.00 g | 100.00 g |

To manufacture the composition, the procedure is generally as follows:

A homogeneous mass is prepared from water, one or more gelifying agents consisting of polysaccharides appropriate for forming a heat-irreversible gel, one or more edible mushrooms, naturally dark in colouration and flavourless or pleasant in flavour, one or more texturing agents consisting of proteins, and a combination of flavouring substances chosen so as to endow the composition with a pleasant flavour and taste, the mass is given the required shape and, before, during or after shaping, gelification of the mass is induced by a chemical treatment, that is to say cooking in an acidic, sugary medium when the gelifying agent is a pectin of high molecular weight, the action of calcium ions when the gelifying agent is a pectin of lower molecular weight or a water-soluble alginate.

In practice, several embodiments of the process can be distinguished.

If a pectin of high molecular weight is used as gelifying agent, to obtain a preserved mass, a sugary aqueous solution or dispersion of the pectin is prepared, the edible mushroom or mushrooms is/are added, mixing until a homogeneous mass is obtained, the texturing agent or agents and the combination of flavouring substances are added, the mass is brought to and maintained at the cooking temperature, adding the acidic gelification agent, and the mass is given the required shape by extrusion, pouring or moulding, and is allowed to cool.

If a pectin of lower molecular weight or a water-soluble alginate is used, an aqueous solution or dispersion of the pectin or alginate is prepared, the edible mushroom or mushrooms is/are added, mixing until a homogeneous mass is obtained, the texturing agent or agents and the combination of flavouring substances are added, the mass is given the required shape by extrusion, shaping or cutting up, and the mass formed is immersed in a gelification bath, hot or cold, containing calcium ions. The gelification bath consists of an aqueous solution of calcium chloride or lactate or an aqueous suspension of calcium citrate.

According to an especially advantageous embodiment, an aqueous solution or dispersion is prepared from a pectin of lower molecular weight or a water-soluble alginate and complexing agent for calcium ions, the edible mushroom or mushrooms are added, mixing until a homogeneous mass is obtained, the texturing agent or agents and the combination of flavouring substances are added, the mass is treated, hot or cold, with an aqueous suspension of calcium sulphate in an amount greater than the stoichiometric amount required to complex completely the complexing agent introduced, and the mass is given the required form by extrusion, pouring or moulding, before gelification begins. The complexing agent introduced is preferably sodium pyrophosphate.

It is possible, for example, to mix the pyrophosphate with sodium alginate, disperse the mixture in water with stirring, add finely ground *Cenococcum geophilum* and/or black truffle, add the other ingredients except calcium sulphate, mix until a homogeneous mass is obtained, heat the mass to 70° C. or wait 15 minutes, add calcium sulphate dispersed in a little water and shape the composition immediately.

The composition can be moulded, poured or extruded in various forms, according to the application envisaged. For example, it can be shaped in the form of sticks of circular or any section, in the form of cubes intended for mixing with meat preparations or in any other decorative form suited to its use.

Finally, the shaped products are sterilised, preferably by heating in an autoclave at 120° C. in a water vapour medium for 20–30 minutes, and they are packaged, for example in metal cans, in bottles or by working under vacuum.

EXAMPLE OF USE IN A MEAT PIE

For 6 to 8 people

Ingredients for the short pastry: 400 g of flour, 200 g of butter or margarine, 1 teaspoonful of salt.

For the garnishing: 250 g of veal meat or scraps of roast veal, 250 g of sausagemeat, 250 g of fatty bacon, 250 g of pig's liver, 50 g of the foodstuff composition according to the invention, in the form of mini-cubes, 2 tablespoonsful of brandy, 1 sachet of Madeira jelly, 1 egg, salt and pepper.

For the mould: 20 g of butter,

Pour the flour into a basin, form a well (a hollow) in the centre, put the butter cut into pieces and the salt in this well, work it with the fingertips, add 1 glass of water while kneading lightly until the pastry comes away from the bowl, and roll it into a ball.

Cut the veal, bacon and liver into small pieces; mix them with the sausagemeat, add the brandy, add salt and pepper and mix.

Heat the oven to average temperature, generously butter a large cake mould.

Roll ⅔ of the pastry to a rectangle 6 millimeters thick, line the mould with it pushing the hand into the bottom so that the pastry adopts the contours of the mould, allowing the pastry to project slightly over the rim.

Fill the mould with the chopped meat, pressing it down with the back of the hand. Distribute the foodstuff composition in the mass.

Roll out (flatten) the remainder of the pastry, form it into a rectangular lid.

Place the lid on the mould, wet the edges of the pastry and fold them onto the lid while forming a border and uniting them with the fingertips or the prongs of a fork.

Cut out a circle about one centimeter in diameter in the centre of the lid, insert into it a small chimney made from aluminium foil rolled around the finger, and decorate the lid with a few geometrical designs traced with the point of a knife.

Break the egg, separating the yolk from the white, brush the pie with egg yolk, slide it into the oven and cook in a moderate oven for about 1 hour 30 minutes.

When the pie is lukewarm, remove it from the mould and allow it to cool down on a grid.

Prepare the jelly according to the instructions given, allow it to cool slightly and pour it into the pie through the chimney, serve cold.

The prior state of the art can be illustrated by the following documents.

Published (before examination) German Patent Application No. 2,905,920. Large mushrooms are washed with boiling water, the stalk is removed and a stalk-shaped meatball is placed in the hole which has been formed at the base of the cap; on sterilisation, the meatball expands and remains thus attached to the cap. The meatball can contain various spices and, in the form of puree, the mushroom stalk itself. A highly tasty food of pleasant appearance, ready for serving, is thereby obtained.

French Patent Application No. 2,311,498. By cultivating strains of the species Polyporus in depth in a carbohydrate medium according to a continuous process, a mycelium is obtained of high nutrient value, rich in proteins. It can be used as an additive in meat products, as a raw material for the production of synthetic meat, or as an additive in cheeses, preserved vegetables, bread and pastries.

French Patent Application No. 2,430,210. Mushrooms are subjected to a preservation treatment in syrups containing a preservative of colour and flavour, for example ascorbic acid, and optionally a gelifying agent such as pectin, until the sugar content is of the order of 60%. A long-life foodstuff product is thus obtained which can be used in pastries and confectionery, especially for making icecream, sorbets and sweets.

French Patent Application No. 2,313,872. The starting material i a fungal mycelial mass having reduced turgidity, which is rolled between two moving surfaces so that it becomes shaped into a cylinder, two or more sections of the cylinder are piled on each other and the pile thus formed is rolled. A corresponding mass is obtained, but one which is textured, with a stratified and fibrous structure similar to that of meat or fish, and which is acceptable for human consumption.

I claim:

1. In a meat-decorating composition for providing meat with a dark brown color, which composition comprises a gelifying agent, a texturing agent, flavoring substances and water, the improvement which comprises employing as a coloring agent an amount effective to provide a desired dark brown color of (a) an edible mushroom selected from the group consisting of *Cenococcum geophilum, Cenococcum graniforme, Tuber melanosporum (Tuber nigrum)* and *Craterellus cornu copioides.*

2. A composition according to claim 1, wherein said composition comprises in addition to said edible mushroom based on total weight of said composition:
   (b) as a gelifying agent, a polysaccharide which forms a heat-irreversible gel, in an amount of from 1 to 5% by weight;
   (c) as a texturing agent, a protein in an amount of from 3 to 12% by weight;
   (d) a combination of flavoring substances which endow the composition with a pleasant flavor and taste in an amount of from 6 to 20% by weight; and
   (e) water to make 100%.

3. A composition according to claim 1, wherein said edible mushroom is *Cenococcum geophilum* or *Cenococcum graniforme.*

4. A composition according to claim 2, wherein the gelifying agent (b) is a pectin of high molecular weight, a pectin of lower molecular weight or a water-soluble alginate.

5. A composition according to claim 4, wherein the pectin of high molecular weight is used in acidic, sugary medium, and the pectin of lower molecular weight or water-soluble alginate is used together with a calcium salt.

6. A composition according to claim 5, wherein the calcium salt is a chloride, lactate, citrate or sulphate.

7. A composition according to claim 6, wherein calcium sulphate is used in the presence of a complexing agent for calcium ions.

8. A composition according to claim 2, wherein the texturing agent (c) is soya bean flour or egg white.

9. A composition according to claim 1, wherein the flavoring substances (d) are selected from the group consisting of liqueur-like wine, a sweetener, salt, spices, vegetables or extracts thereof, fruits or extracts thereof, plants or extracts thereof and flavorings which produce a pleasant flavor and taste.

10. A composition according to claim 3, wherein said composition contains: *Cenococcum geophilum* or *Cenococcum graniforme;* sodium alginate, calcium sulphate and sodium pyrophosphate; soya proteins, egg white or a mixture thereof; a liqueur-like wine, sugar, salt, spices, vegetables or extracts thereof, fruits or extracts thereof, plants or extracts thereof, flavorings or a mixture thereof which produce a pleasant flavor and taste; and water.

11. A composition according to claim 1, wherein said composition contains: *Tuber melanosporum* (*Tuber nigrum*); sodium alginate, calcium sulphate and sodium pyrophosphate; soya proteins, egg white or a mixture thereof; a liqueur-like wine, sugar, salt, spices, vegetables or extracts thereof, fruits or extracts thereof, plants or extracts thereof, flavorings or a mixture thereof which produce a pleasant flavor and taste; and water.

12. A composition according to claim 1, wherein said composition contains: *Craterellus cornu copiodes;* sodium alginate, calcium sulphate and sodium pyrophosphate; soya proteins, egg white; a liqueur-like wine, sugar, salt, spices, vegetables or extracts thereof, fruits or extracts thereof, plants or extracts thereof, flavorings or a mixture thereof which produce a pleasant flavor and taste; and water.

13. A composition according to claim 1, wherein said composition contains, in addition, a preservative, an antioxidant or a mixture thereof.

14. A method for providing meat with a dark brown color, which comprises applying to said meat a meat-decorating composition which comprises as a coloring agent, an amount effective to provide a desired dark brown color of an edible mushroom selected from the group consisting of *Cenococcum geophilum, Cenococcum graniforme, Tuber melanosporum* (*Tuber nitrum*) and *Craterellus cornu copiodes*.

15. A method according to claim 14, wherein said edible mushroom is *Cenococcum geophilum* or *Cenococcum graniforme*.

16. A method according to claim 14, wherein said meat-decorating composition further comprises:
  (b) as a gelifying agent, a polysaccharide which forms a heat-irreversible gel in an amount of from 1 to 5% by weight;
  (c) as a texturing agent, a protein in an amount of from 3 to 12% by weight;
  (d) a combination of flavoring substances which endow the composition with a pleasant flavor and taste in an amount of from 6 to 20% by weight; and
  (e) water to make 100%, based on total weight of the composition.

17. A method according to claim 16, wherein the gelifying agent (b) is a pectin of high-molecular weight, a pectin of lower molecular weight or a water-soluble alginate.

18. A method according to claim 16, wherein the texturing agent (c) is soya bean flour or egg white.

19. A method according to claim 16, wherein the flavoring substances (d) are selected from the group consisting of liqueur-like wine, a sweetener, salt, spices, vegetables or extracts thereof, fruits or extracts thereof, plants or extracts thereof and flavorings which produce a pleasant flavor and taste.

20. In a method for preparing a meat-decorating composition for providing meat with a dark brown color, the improvement which comprises employing as a coloring agent an amount effective to provide a desired dark brown color of an edible mushroom selected from the group consisting of *Cenococcum geophilum, Cenococcum graniforme, Tuber melanosporum* (*Tuber nigrum*) and *Craterellus cornu copioides.*

* * * * *